Jan. 20, 1970 SHIH-MING HU 3,491,325

TEMPERATURE COMPENSATION FOR SEMICONDUCTOR DEVICES

Filed Feb. 15, 1967 2 Sheets-Sheet 1

INVENTOR
SHIH-MING HU
BY David E. Lovejoy
AGENT

Jan. 20, 1970 SHIH-MING HU 3,491,325

TEMPERATURE COMPENSATION FOR SEMICONDUCTOR DEVICES

Filed Feb. 15, 1967 2 Sheets-Sheet 2

United States Patent Office 3,491,325

Patented Jan. 20, 1970

3,491,325

TEMPERATURE COMPENSATION FOR SEMICONDUCTOR DEVICES

Shih-Ming Hu, Beacon, N.Y., assignor to International Business Machines Corporation, Armonk, N.Y., a corporation of New York

Filed Feb. 15, 1967, Ser. No. 616,355

Int. Cl. H01c *7/04;* H01l *3/00, 3/12*

U.S. Cl. 338—22 13 Claims

ABSTRACT OF THE DISCLOSURE

Disclosed is a temperature compensated semiconductor resistive element exhibiting a preselected temperature coefficient of resistivity (TCR). The TCR may be made positive, near zero, or negative over a temperature range from room temperature upwards by selecting, for total impurity concentrations generally exceeding $8\times10^{18}$ atoms-cm.$^{-3}$, the free carrier concentration within the range from $1.7\times10^{18}$ to $1.3\times10^{19}$ carriers-cm.$^{-3}$. Well known double diffusion steps using shallow-energy-level donor and acceptor dopants are employed to achieve the desired concentration.

BACKGROUND OF THE INVENTION

This invention relates to electrical impedances formed of semiconductor materials and more particularly to resistive impedances wherein the variation of resistance as a function of temperature is specified and controlled.

The evolution of prior art resistive impedances has proceeded in light of the general trend toward microminiaturization of electrical circuits and in light of the desire to gain temperature independent resistors. Prior art deposited thin-film resistors have exhibited undesirable temperature-caused resistance variations because of their large surface-to-bulk ratios. Prior art uncompensated semiconductor diffused resistors although of a geometrically solid nature (as distinguished from the essentially planar thin films) suffer from a temperature-caused resistance variation due to the dependence of the charge carrier mobility upon temperature. Where temperature independence has been desired, therefore, cermet resistors have been preferable over these prior art uncompensated diffused resistors and prior art thin-film resistors. Cermet resistors, however, present a problem because they are incompatible from a manufacturing point of view with the crystalline structures attendant microminiaturization in completely integrated circuits.

One technique for overcoming the temperature dependence problem appears in the U.S. Patent 3,248,677 by Hunter and Woods which has the same assignee as the present invention. As is apparent from that patent, the resistance, R, of a resistor is defined by the following equation:

$$R=\langle\rho\rangle(1/A) \qquad \text{Eq. (1)}$$

where

1=length of resistor
A=cross-sectional area of resistor
$\langle\rho\rangle$=average resistivity=

$$(l/x_j)\int_0^{X_j}(l/\rho)dx \qquad \text{Eq. (1a)}$$

where Eq. (1a)

$x$=distance from surface
$X_j$=junction depth
$\rho$=local resistivity (a function of $x$)

The value of local resistivity, $\rho$, is of course given by the following expression:

$$\rho=1/(ne\mu) \qquad \text{Eq. (2)}$$

where $e$=the electric charge per carrier
$n$=the concentration of free charge carriers
$\mu$=the carrier mobility Under normal conditions, the mobility, $\mu$, in Eq. (2) decreases significantly with increasing temperature, thereby causing the resistivity to increase significantly with temperature. In the mentioned prior art patent, this decreasing temperature dependence of $\mu$ is compensated for by providing a "deep level" impurity concentration which exhibits a temperature dependent increase in carrier concentration tending to offset the decreasing mobility change. The resultant effect of the "deep level" compensation is to bring the resistivity closer to temperature independence. This "deep level" techniqu is not fully desirable, however, because of the undesirability of using some deep level dopants (such as copper) when considering avalanche breakdown. Additionally, the "deep level" compensation method does not achieve as great a compensation for the effects of temperature variations on resistivity as does the present invention.

In order to make comparisons between the effects of temperature variations on the resistivities of the various resistive devices, it is useful to define a temperature coefficient of resistivity, TCR, which is given by the following expression:

$$TCR=(\Delta R/R)\ /\Delta T \qquad \text{Eq. (3)}$$

where:

$\Delta R/R$=the percentage change in resistance
$\Delta T$=the change in absolute temperature Using the TCR standard, it is clear that for uncompensated prior art diffused resistors the TCR is positive. Although the aforementioned compensation technique in the patent to Hunter and Woods may reduce the TCR to a value closer to zero (complete temperature independence) it does not reduce it to zero nor does it allow for negative values of TCR. For the example given in that patent, a +4% variation occurs over the 50° range from 20° C. and 70° C. By extrapolation, an 8% variation over a 100° C. range might be expected.

Although those values of resistivity may be adequate for some applications, it is desirable and an object of the present invention to provide resistivities which will yield a predetermined TCR closer to zero and which may in fact be made to go negative if that is desired for special devices. Another objective of this invention is to make devices having preselected TCR's while still employing conventional planar fabrication methods which are compatible with integrated circuit fabrication processes. These and other objects and advantages attendant the present invention are apparent in the summary which follows.

SUMMARY OF THE INVENTION

The theory of the present invention is to alter the normally highly temperature dependent carrier mobility, $\mu$, so that it is less temperature dependent thereby yielding temperature coefficients of resistivity (TCR) which may be made very close to zero or even slightly negative if desired. The altering of the carrier mobility is achieved by doping both shallow energy level donors and shallow energy level acceptors into a semiconductor body where the donor concentration exceeds the acceptor concentration by a value in the range from $1.7\times10^{18}$ to $1.3\times10^{19}$ carriers-cm.$^{-3}$. Within that range, the TCR varies from negative at a free carrier concentration of $0.20\times10^{19}$ cm.$^{-3}$ to near zero at a concentration of $0.86\times10^{19}$ cm.$^{-3}$ to positive at a concentration of $3.2\times10^{19}$ cm.$^{-3}$ as long as the total impurity concentration (i.e. the sum of donors and acceptors) is in the $10^{19}$ atoms-cm.$^{-3}$ range. Thus the invention provides the ratio of donor atoms to acceptor atoms in the range of about 1:1 to about 3:1, as compared to the ratios conventionally employed in the prior art which are normally in the range of about 10:1 to about 100:1.

The above-noted concentrations are achieved using standard planar double diffusion techniques. Either two single diffusion steps or one double diffusion step may be employed.

The double diffusion in the above concentrations alters the normal relationship between the two most temperature variant components of carrier mobility. Those components are the lattice scattering component, $\mu_L$ and the impurity scattering component $\mu_I$ which are related to the over-all mobility, $\mu$, as follows:

$$1/\mu = 1/\mu_L + 1/\mu_I \quad \text{Eq. (4)}$$

By way of background, the effect of $\mu_L$ in Eq. 2 normally predominates over the effect of $\mu_I$ at room temperature and above. Since lattic scattering increases with increasing temperature thereby causing the lattice mobility $\mu_L$ to correspondingly decrease, the normally more dominant lattice mobility $\mu_L$ causes the over-all mobility $\mu$ to correspondingly decrease with increasing temperature. The decrease in mobility $\mu$ gives rise, of course, to the undesired positive TCR. Although impurity scattering decreases with increasing temperature giving rise to an impurity mobility $\mu_I$ which increases with increasing temperature, the normally less dominant $\mu_I$ does not normally sufficiently compensate for the effects of $\mu_L$ and therefore does not yield the desired temperature independence.

In accordance with the present invention, the effect of the impurity mobility $\mu_I$ is enhanced to the point where it compensates the lattice mobility $\mu_L$ when the following conditions are met: the temperature is room temperature and above, the free carrier concentration ranges from $1.7\times10^{18}$ cm.$^{-3}$ to $1.3\times10^{19}$ cm.$^{-3}$, and the total impurity concentration is generally above $8\times10^{18}$ atoms-cm.$^{-3}$. The degree by which the relationship between $\mu_I$ and $\mu_L$ is altered is, for the temperature and concentration ranges stated, an indirect function of the free carrier concentration and the total impurity concentration.

Using well known diffusion techniques, the positive, near zero, or negative value of TCR is controlled and predetermined accordingly to the present invention by diffusing both donor and acceptor dopants, having the total impurity concentration range above indicated, into a semiconductor body to achieve the desired free carrier concentration.

The following and other objects, features, and advantages of the invention will be apparent from the following more particular description of preferred embodiments of the invention, as illustrated in the accompanying drawings.

FIG. 1($b$) illustrates a top view of the device of FIG. 1($a$).

FIG. 2($b$) depicts a graph of the percentage change in resistivity as a function of temperature for a typical compensated diffused layer resistive impedance element made in accordance with the present invention.

Figure 4A:
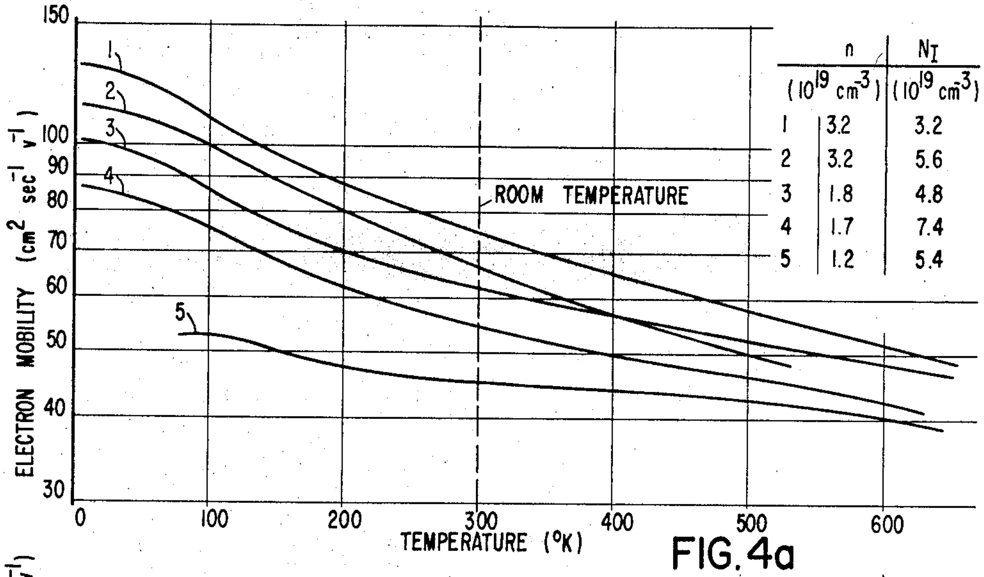
Figure 4B:
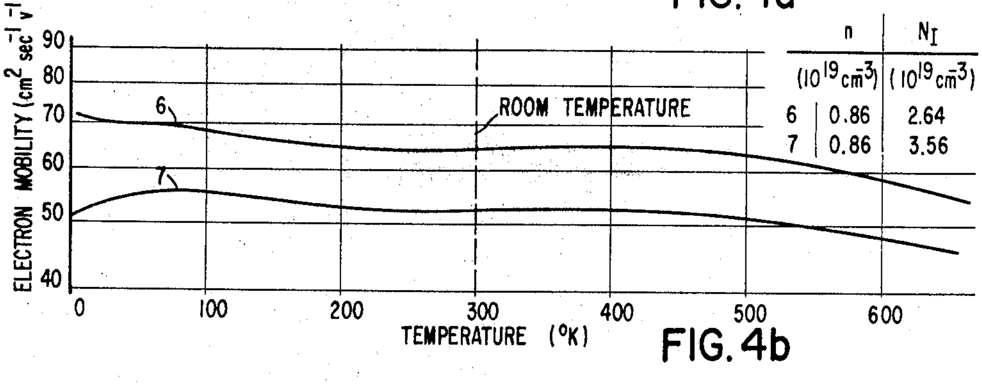
Figure 4C:
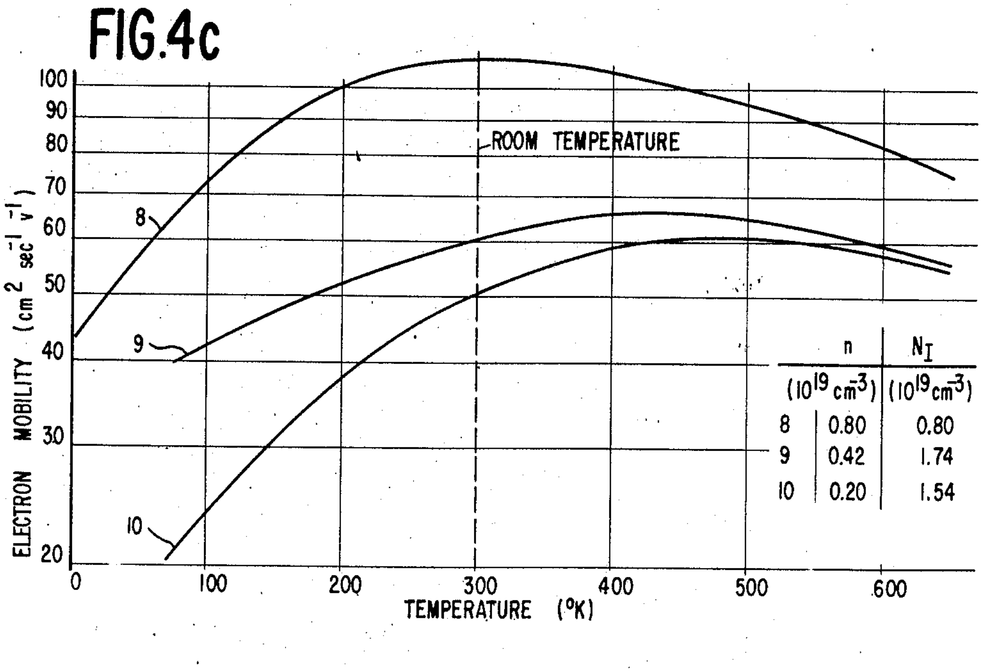

FIGS. 4($a$), 4($b$), and 4($c$) depict experimental relationships between carrier mobility and temperature for various samples having different free carrier and total impurity concentrations.

DESCRIPTION OF THE INVENTION

Before giving detailed examples of the methods and products of the present invention, an introductory explanation of prior art theories and the theory believed to describe the present invention will be given. As previously mentioned, the resistivity, $\rho$, is defined by Eq. 2. In that equation, the free carrier concentration, $n$, is determined primarily by the difference in concentration of the dopants ($N_D - N_A$) and their energy levels, $E_D$ and $E_A$, within the energy gap and with respect to the conduction band. If $E_D$ is very small as it is with phosphorus, arsenic, and other shallow level dopants and if $N_D$ is greater than $N_A$, then $n$ will be equal to ($N_D - N_A$) for temperatures from room temperature and above. Under these normal conditions, $n$ is independent of temperature and accordingly, plays no part in the variation of $\rho$ with temperature. For this reason, the theory of the present invention should be distinguished from the aforementioned Hunter and Woods patent wherein that concentration is purposely made to vary, in a compensating manner, with temperature.

Under normal conditions, the other quantity in Eq. 2, the over-all carrier mobility $\mu$, is responsible for the temperature dependence of $\rho$. The carrier mobility normally tends to nonlinearly decrease with temperature (approximately with $T^{-2}$). Since $\mu$ normally causes the undesired variation, in $\rho$, $\mu$ must be examined more closely to determine why it varies and how the variance can be overcome.

The over-all carrier mobility can be represented as the sum of the effects of two distinct scattering phenomena. By "scattering" it is meant that the trajectory of a moving carrier (such as an electron or a hole) is deflected from its course by the presence of a force created by certain agencies. An increase in scattering, therefore, causes a corresponding decrease in carrier mobility. One agency creating a force affecting scattering is the lattice vibration of the semiconductor. This vibration gives rise to the phenomenon called "lattice scattering." As temperature increases, the vibration forces increase and therefore lattice scattering increases. These temperature-caused variations in lattice scattering give rise to a temperature variant component in the over-all charge carrier mobility $\mu$ called the lattice mobility, $\mu_L$. Since lattice scattering increases with increasing temperature, the lattice mobility $\mu_L$ correspondingly decreases with increasing temperature.

The other important agency affecting scattering arises from the forces exerted by electric charge centers entrapped within the semiconductor body. These charge centers are formed when a dopant atom becomes ionized in the semiconductor and gives up an electron which is free to move through the semiconductor. When the donor atom becomes ionized it acquires a positive charge which is embedded within the semiconductor body and which acts as a coulombic scattering center. As free carriers move by the scattering center, the coulombic forces act to repulse or attract the moving carriers giving rise to the "impurity scattering" phenomenon. Impurity scattering decreases with increasing temperature because the increase in temperature imparts a greater velocity to the free electrons. This greater velocity increases the electron momentum so that each electron is less influenced by the forces caused by the coulombic scattering centers. The component of mobility arising from impurity scattering is defined as the impurity mobility, $\mu_I$. Since impurity scattering decreases with temperature the impurity mobility $\mu_I$ correspondingly increases with increasing temperature.

The relationship between the over-all mobility and the component lattice and impurity mobilities is given by Eq. 4 above and therefore an examination of the nature of the values to be used in that equation is desirable.

The lattice mobility, $\mu_L$, for electrons and holes in silicon has been found, both experimentally and theoretically, to decrease very rapidly with increasing temperature (i.e., more than inversely proportional to the absolute temperature T). For example, Morin and Maita in Phys. Rev. 96, 28 (1954) have determined the following empirical formulas from experimental data:

$$\mu_L=(4.0\times10^9)\ T^{-2.6}, \text{ for electrons}$$
$$\mu_L=(2.5\times10^9)\ T^{-2.3}, \text{ for holes} \quad \text{Eqs. (5)}$$

By way of comparison, C. Herring in the Bell Syst. Tech. J. 34, 237 (1955) has derived a theoretical equation which predicts a temperature dependence proportional to $T^{-1.5}$. Although the exponents of T differ, the important point to note is that in both cases the lattice mobility is found to decrease very rapidly due to the negative exponent greater than one.

The impurity mobility, $\mu_I$, has also been derived theoretically by Brooks in Phys. Rev. 83, 879 (1951) as follows:

$$\mu_I=\frac{2^{7/2}\epsilon^2(KT)^{1.5}}{\pi^{3/2}M^{1/2}e^3N_I\log\left[(1+b)-\frac{b}{1+b}\right]} \quad \text{Eq. (6)}$$

where $$b=\frac{24\pi M\epsilon(KT)^2}{e^2h_2N_I}$$

$N_I$=total impurity concentration

By noting that the logarithmic function in the denominator of Eq. 6 is a very slowly varying function it can be concluded that $\mu_I$ is proportional to $T^{+1.5}$ and inversely proportional to the total impurity concentration $N_I$.

Figure 3:
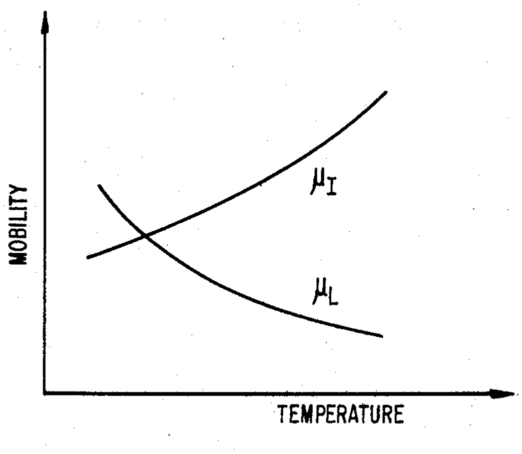
FIG. 3 illustrates schematically the relationship between the lattice scattering and impurity scattering components of over-all carrier mobility.

By comparing the above expressions for $\mu_L$ and $\mu_I$ it is clear as shown in FIG. 3 that $\mu_L$ and $\mu_I$ vary in opposite directions. The theory of the present invention, therefore, is to enhance the effect of the $\mu_I$ component to the point where it compensates for the effect of the normally dominant $\mu_L$ component. As is clear from Eq. 4, in order to make $\mu_I$ compensate for $\mu_L$, $\mu_I$ must be made very small so that its reciprocal, $1/\mu_I$, becomes very large. In order to achieve this desired change in $\mu_I$, it is logical to look to Eq. 6 to determine what factor might be varied. By examining Eq. 6 it appears that if $N_I$ is increased sufficiently, $\mu_I$ would become small enough to compensate for the lattice scattering. Unfortunately, this is not true in fact since $\mu_I$ normally reverses direction and begins to increase with increasing concentrations above $10^{18}$ atoms-cm.$^{-3}$. The failure of Eq. 6 to explain the actual relationship arises because the theory of impurity scattering on which Eq. 6 is based breaks down and becomes invalid at high impurity concentrations. In reality, $\mu_I$ begins to increase with increasing $N_I$ and also with decreasing temperature when the impurity concentration reaches and exceeds $10^{18}$ atoms-cm.$^{-3}$. If the impurity scattering relationship of Eq. 6 were valid at concentrations above $10^{18}$ atoms-cm.$^{-3}$, then the impurity concentration at approximately $10^{19}$ atoms-cm.$^{-3}$ would be such that the impurity scattering would balance out the lattice scattering with the result being substantial temperature independence for $\mu$ and, of course, for $\rho$.

A number of known phenomena are the causes of the breakdown at high impurity concentrations of the impurity scattering theory embodied in Eq. 6. For example, the inter-impurity atom distance becomes so small that the electron "Bohr orbitals" overlap forming a so-called impurity band resulting in inter-band scattering. Also, the electron wave length at room temperature becomes very close to the value of the impurity distance so that the "Born approximation" method used in deriving Eq. 6 is no longer valid. Additionally, at the small inter-impurity distance existing at room temperature, the "phase shift" of the scattered electron may become and exceed 180° thereby fostering a resonance scattering phenomenon. These phenomena are not meant to be exhaustive as other yet unidentified phenomena probably contribute to the breakdown of the theory.

The failure of an increased total impurity concentration [contrary to what might be predicted from the theory embodied in Eq. 6] to compensate for the effects of lattice scattering above room temperature in heavily doped materials is, of course, verified in the prior art. For example, in the data by Chapman et al. (J. Appl. Phys. 34, 3291 (1963)), the resistivity of all samples doped with a concentration ranging from $1.7\times10^{18}$ to $1.3\times10^{20}$ atoms-cm.$^{-3}$ increases with an increase of temperature above room temperature. Therefore, a new theory is necessary to explain the occurrences at high concentrations.

It is believed in accordance with the theory of the present invention that the overlapping of orbitals and the formation of an impurity band in a compensated semiconductor is determined by the concentration, $n$, of the free carriers and not by the total impurity concentration, $N_I$. This theory is consistent with the behavior of uncompensated semiconductors since, in uncompensated semiconductors, the free carrier concentration is equal to the impurity concentration. Additionally, this theory is supported by the fact that the resonance scattering phenomenon will not occur at low free carrier concentrations.

Reviewing the prior theory for the purposes of comparison with the present theory, it should be recalled that for total impurity concentration $N_I$ below $1.7\times10^{18}$ atoms-cm.$^{-3}$ and as $N_I$ increases, the number of coulombic scattering centers increases and therefore the total impurity scattering increases thereby tending to decrease the mobility (increase resistivity) at any given temperature. Also, with a constant $N_I$ for concentrations below $1.7\times10^{18}$ atoms-cm.$^{-3}$ impurity scattering decreases with increasing temperature thereby giving rise to an impurity mobility (a component of over-all mobility) which increases for increasing temperature. Above total impurity concentrations of $1.7\times10^{18}$ atoms-cm.$^{-3}$, that impurity scattering prior art theory breaks down because of the formation of an impurity band as previously discussed in relation to the breakdown of the impurity scattering theory. Above total concentrations of $1.7\times10^{18}$ atoms-cm.$^{-3}$ and for temperatures from room temperature and above, an increase in $N_I$ does not under normal conditions make impurity scattering significant with regard to lattice scattering because of the formation of the impurity band.

Under the theory of the present invention, however, the formation of the impurity band at concentrations above $1.7\times10^{18}$ atoms-cm.$^{-3}$ is inhibited by interdispersing acceptor atoms among the majority donor atoms. The acceptor atoms become ionized by capturing electrons and these ionized acceptor atoms act as repulsive centers to the free electron carriers as contrasted with the majority donor atoms which act as attractive centers. Since these repulsive centers are interspersed among the majority attractive centers and since only attractive centers can produce orbitals, the inclusion of the repulsive centers "chops up" what would normally be the impurity band thereby inhibiting the formation of that band.

With the impurity band inhibited in the manner outlined above, the significance of the impurity mobility's contribution to the over-all mobility $\mu$ can be increased by increasing the total impurity concentration $N_I$ to a value in the range above $8\times10^{18}$ atoms-cm.$^{-3}$. An increase in $N_I$, above the stated concentration, increases the impurity scattering and decreases $\mu_I$ thereby enhancing the effect of $\mu_I$ on the over-all mobility $\mu$ as can be seen from Eq. 4. With impurity scattering enhanced in this manner, $\mu_I$'s increase with increasing temperature compensates for $\mu_L$'s decrease with increasing temperature above room temperature.

The above enhanced effect for $\mu_I$ as a result of the increase in $N_I$ above $8\times10^{18}$ atoms-cm.$^{-3}$ was achieved only upon the condition that the concentration of free carriers was not so high as to result in the creation of an impurity band. The creation of the impurity band results from an increase in free carriers which gives rise to a reduction in the interatomic distances and to an overlapping or orbitals. As the population of free carriers increases the probability of the carriers jumping out of the closely packed orbits and forming an impurity band increases until the point is reached where the impurity scattering theory again breaks down.

In light of the above discussion of the theory of the present invention, it is apparent that the two most important parameters in selecting and making a resistive impedance device with predetermined resistivity and predetermined TCR are the free carrier concentration, $n$, and the total impurity concentration, $N_I$, which are given respectively by the following equations:

$$n=N_D-N_A \qquad \text{Eq. (7)}$$

$$N_I=N_D+N_A \qquad \text{Eq. (8)}$$

where $N_D$=the donor concentration
$N_A$=the acceptor concentration

Figure 2A:
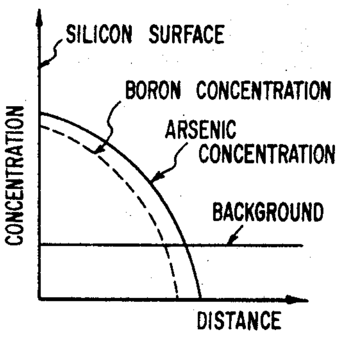
FIG. 2($a$) illustrates a graph of the dopant concentrations within a typical semiconductor body as a function of the distance below the diffusion surface of that body.
Figure 2B:
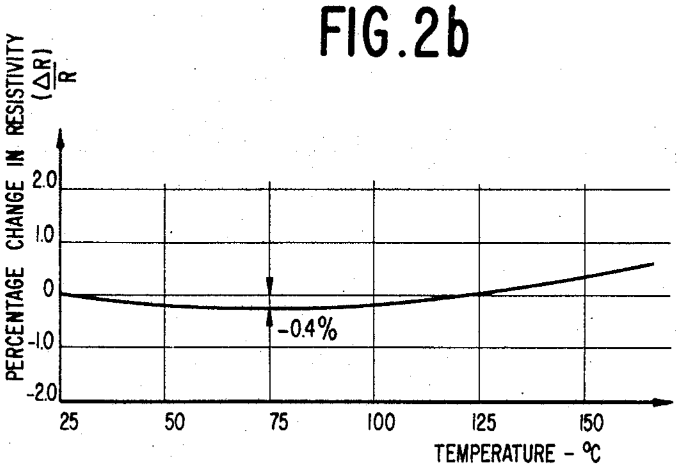

The above theories are supported by actual test data as represented in FIGS. 4(*a*)–4(*c*). The data presented in those figures was derived from homogeneously doped samples (i.e., the impurity concentration of each dopant was constant throughout the entire semiconductor body). For practical applications, however, diffusion processes are preferred and will produce resistors having a dopant concentration varying from the surface to the interior of the body as graphically represented in FIG. 2(*a*) for a typical device. This concentration gradient presents no problem, however, since Eq. 1*a* is merely used to calculate the average resistivity which inturn is used in Eq. 1 to determine the resistance. FIGURES 4(*a*), 4(*b*), and 4(*c*) depict mobility as a function of temperature. The free carrier concentrations, $n$, and the total impurity concentrations, $N_I$, are given in the following chart and also adjacent the figures.

CHART

| Curve | n ($10^{19}$ cm.$^{-3}$) | $N_I$ ($10^{19}$ cm.$^{-3}$) |
|---|---|---|
| 1 | 3.2 | 3.0 |
| 2 | 3.2 | 5.0 |
| 3 | 1.8 | 4.4 |
| 4 | 1.7 | 7.2 |
| 5 | 1.2 | 5.6 |
| 6 | 0.86 | 2.64 |
| 7 | 0.86 | 3.54 |
| 8 | 0.80 | 0.84 |
| 9 | 0.42 | 1.74 |
| 10 | 0.20 | 1.58 |

It is apparent from the above chart and the curves of FIG. 4 that (for total impurity concentrations in the range of $10^{19}$) decreasing values of free carrier concentration, $n$, shift the mobility slopes generally from negative to positive. More particularly, the curves in FIG. 4(*a*) illustrate mobilities which give rise to decreasingly positive TCR's ending with Curve 5 which has a value of $n$ equal to $1.2\times10^{19}$ cm.$^{-3}$. Curve 5 indicates a mobility almost independent of temperature and would correspondingly give rise to a resistor having a resistance almost independent of temperature.

In FIG. 4(*b*), both Curves 6 and 7 represents a device in accordance with the present invention having a mobility which would give rise to a TCR near zero particularly for values above room temperature. Although Curves 6 and 7 have essentially the same shape they are displaced from each other because of the difference in total impurity concentration $N_I$. The relationship between $n$, $N_I$ and the concentrations of acceptors and donors is, of course, expressed in Eq. 7 and Eq. 8. For those equations, the values of $N_D$ and $N_A$ may be determined for any of the curves in FIG. 4 (by calculation using the values in the above chart).

DETAILED EXAMPLES

Figure 1A:
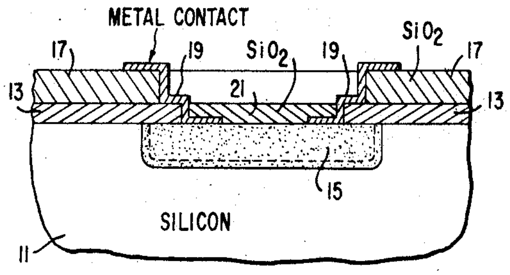
FIG. 1($a$) illustrates a cross-sectional view of a resistive impedance element made in accordance with the present invention.
Figure 1B:
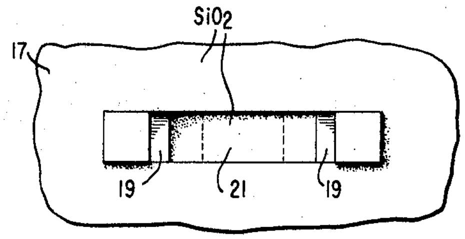

The total impurity ions necessary to enhance the impurity scattering in relation to the lattice scattering for total concentrations in the range of $10^{19}$ cm.$^{-3}$ may be provided using any of the well known semiconductor fabrication techniques. Any shallow level donor and acceptor dopants may be used. Illustrations of an ultimate device are shown in FIGS. 1(*a*) and 1(*b*).

A first example employs arsenic and boron as the shallow level dopants. Arsenic is first diffused at 1200° C. into a P-type silicon body, having a background resistivity of 5 ohm-cm., to form a junction depth of 1.8$\mu$ with a surface concentration of $4.5\times10^{19}$ atoms-cm.$^{-3}$. The arsenic diffusion is followed by a boron deposition at 1100° C. followed by a boron drive-in at 1050° C. to yield a junction depth of 2.0$\mu$ and a surface concentration of $2\times10^{19}$ atoms-cm.$^{-3}$. The sheet resistivity obtained by that double diffusion is approximately 110 ohms per square and has a maximum variation from that value of 0.4% over the temperature range from room temperature up to 125° C. The sheet resistivity, $\rho_s$, is defined by the following equation:

$$\rho_s=\frac{1}{\int_0^{xj} dx/\rho} \qquad \text{Eq. (9)}$$

It is apparent from the above example that the small variation of resistivity over the 100° C. range is more than a ten fold improvement over resistivity variations of known diffused resistors and is also generally superior to any other known compensated resistor. It should also be noted that this improvement is achieved using a method which is entirely compatible with the microminiaturization techniques commonly employed in producing integrated circuits.

While the above example illustrates a near zero TCR (+0.4% over 100° C.), the following example illustrates a negative TCR. It should be remembered that the TCR is readily controlled by controlling the proportions of donors and acceptors. A resistor exhibiting a negative TCR is produced by diffusing into a P-type silicon body, of 5 ohm-cm. background resistivity, at 1200° C. until a junction depth of about 2$\mu$ is reached with an arsenic surface concentration of 4.0 to $4.5\times10^{19}$ atoms-cm.$^{-3}$ and a boron surface concentration of $3\times10^{19}$ atoms-cm.$^{-3}$. This double diffusion produced a sheet resistivity of approximately 500 ohm-cm. at room temperature with an average TCR of −4.0% over the 100 degree C. range above room temperature.

Returning again to FIG. 1(*a*), a portion of the 5 ohm-cm. P-type silicon base 11 is shown. Atop the silicon base 11 is a masking layer 13 of $SiO_2$ which is deposited by well known techniques. The diffused region 15 contains an interdispersion of donor and acceptor dopants and is diffused through an opening in the masking layer 13. An additional $SiO_2$ masking layer 17 is deposited upon the $SiO_2$ layer 13. Metal contacts 19 are deposited upon the diffusion region 15 to form ohmic contacts therewith at either end thereof. A final $SiO_2$ layer 21 is deposited between the metal contacts 19 and over any exposed portion of the diffused region 15. All of the above steps are, of course, well known in the semiconductor manufacturing art. FIG. 1(*b*) depicts a top view for a device such as that shown in cross-section in FIG. 1(*a*).

Although the above discussion has been with reference to interdispersions of donors and acceptors where the donor concentration exceeds the acceptor concentration (the free carriers being electrons), it is apparent that the invention equally applies to embodiments wherein the acceptors have a higher concentration than the donors (the free carriers being holes). Under the present state of technology, however, it is preferred to have the donors exceed the carriers and have conduction by electrons.

While the usefulness and utility of semiconductors made in accordance with the present invention will be apparent to those skilled in the art, it should also be noted that resistive devices exhibiting negative TCR in accordance with this invention, are particularly useful in circuitry to compensate for other elements within the circuitry which exhibit a positive TCR. Of course, the negative TCR and other devices of the present invention are not limited to any particular use and may be employed in any electrical circuit whether fully integrated or not.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A silicon semiconductor comprised of a body containing an interdispersion of both shallow-level donor and acceptor type dopants only wherein the atom concentration of one type of said dopants exceeds the atom concentration of the other type of said dopants by an amount producing free carriers in a range from about $1.7 \times 10^{18}$ to $1.3 \times 10^{19}$ carriers-cm.$^{-3}$, wherein the total impurity concentration is above $8 \times 10^{18}$ atoms-cm.$^{-3}$, the lesser concentration dopant present in a concentration exceeding $10^{18}$ atoms-cm.$^{-3}$ and wherein the type dopant having the smaller concentration forms coulombic scattering centers which inhibit the formation of the impurity band.

2. The semiconductor of claim 1 wherein the atom concentration of said donor exceeds the atom concentration of said acceptor type dopants and wherein said free carriers are electrons.

3. A compensated silicon semiconductor member comprising, a body of silicon semiconductor material, a concentration of both diffused shallow-level acceptor and shallow-level donor dopants only interdispersed within said body, the concentration of donor atoms exceeding the concentration of acceptor atoms to produce free carriers in a concentration ranging approximately from $1.7 \times 10^{18}$ to $1.3 \times 10^{18}$ electrons-cm.$^{-3}$ the acceptor atoms being present in a concentration exceeding $10^{18}$ atoms-cm.$^{-3}$, the total impurity concentration exceeding $8 \times 10^{18}$ atoms-cm.$^{-3}$ and enhancing the impurity scattering component of mobility, said acceptor atoms forming repulsive coulombic scattering centers which inhibit the formation of an impurity band.

4. A method of making a highly doped silicon semiconductor member in which the formation of an impurity band is inhibited comprising the steps of diffusing both a shallow-level arsenic donor dopant into a region of a silicon semiconductor body to obtain a donor concentration, and diffusing a shallow-level boron acceptor dopant into said region of the semiconductor body to obtain an acceptor concentration, said concentrations satisfying the conditions that the sum of said acceptor and donor concentrations exceeds $8 \times 10^{18}$ atoms-cm.$^{-3}$ and that the difference between said donor and acceptor concentrations contributes free carriers in a range from about $1.7 \times 10^{18}$ to $1.3 \times 10^{19}$ carriers-cm.$^{-3}$.

5. A method of making a highly doped silicon semiconductor body in which the formation of an impurity band is inhibited comprising the step of diffusing simultaneously both a shallow-level arsenic donor dopant and a shallow-level boron acceptor dopant into a region of a silicon semiconductor body to obtain a donor concentration and an acceptor concentration, respectively, said concentrations satisfying the conditions that the sum of said acceptor and donor concentrations exceeds $8 \times 10^{18}$ atoms-cm.$^{-3}$ and that the difference between said donor and acceptor concentrations contributes free carriers in a range from about $1.7 \times 10^{18}$ to $1.3 \times 10^{19}$ carriers-cm.$^{-3}$.

6. A method of making a temperature compensated semiconductor resistive impedance member comprising the steps of, diffusing arsensic into a 5 ohm-cm. phosphorus doped silicon body at 1200° C. to form a junction depth of $1.8\mu$ and a surface concentration of $4.5 \times 10^{19}$ atoms-cm.$^{-3}$, diffusing boron into said body at 1100° C. followed by a drive-in at 1050° C. to yield a junction depth of $2.0\mu$ and a surface concentration of $2 \times 10^{19}$ atoms-cm.$^{-3}$, said member exhibiting a substantially uniform resistivity over a predetermined temperature range above room temperature.

7. A silicon semiconductor comprised of a diffused region containing an interdispersion of shallow-level donor and acceptor dopants wherein the concentration of donor carriers exceeds the concentration of acceptor carriers by an amount in the range of about $2 \times 10^{18}$ to about $1.3 \times 10^{19}$ carriers cm.$^{-3}$ said acceptor atoms being present in a concentration exceeding $10^{18}$ atoms-cm.$^{-3}$ and wherein the total combined donor and carrier concentration is above $8 \times 10^{18}$ atoms cm.$^{-3}$.

8. A temperature compensated silicon semiconductor member characterized by a doped silicon semiconductor body having a lattice mobility component of over-all mobility which increases as a function of increasing temperature, having an impurity mobility component of over-all mobility which decreases as a function of increasing temperature, in a temperature range of about 0–600° K., and exhibiting a resistivity wherein the improvement comprises, both shallow-level acceptor and shallow-level donor dopants only interspersed in said body, said donors having an atom concentration exceeding the atom concentration of said acceptors and providing a concentration of free carriers in a range from about $1.7 \times 10^{18}$ to $1.3 \times 10^{19}$ electrons-cm.$^{-3}$, said acceptor atoms being present in a concentration exceeding $10^{18}$ atoms-cm.$^{-3}$, said body containing a total impurity concentration in the range of $8 \times 10^{18}$ atoms-cm.$^{-3}$ to $5.4 \times 10^{19}$ atoms-cm.$^{-3}$ which enhances the impurity mobility, said impurity mobility compensating for temperature-caused variations in said lattice mobility so as to control, in a predetermined manner over a temperature range of about 0–600° K., variations in over-all mobility and resistivity caused by variations in temperature.

9. A temperature compensated silicon semiconductor resistive member characterized by a doped silicon semiconductor body having a lattice mobility component of over-all mobility which decreases as a function of increasing temperature, having an impurity mobility component of over-all mobility which increases as a function of increasing temperature, and wherein the over-all mobility increases and then decreases over a temperature range of about 0–600° K., comprising, both shallow-level acceptor and shallow-level donor dopants only interspersed in said body, said donors having an atom concentration exceeding the atom concentration of said acceptors and providing a concentration of free carriers in the range of about $2 \times 10^{18}$ electrons-cm.$^{-3}$ to $8 \times 10^{18}$ electrons-cm.$^{-3}$, said acceptor atoms being present in a concentration exceeding $10^{18}$ atoms-cm.$^{-3}$, said body containing a total impurity concentration in the range of about $8 \times 10^{18}$ atoms-cm.$^{-3}$ to about $1.8 \times 10^{19}$ atoms-cm.$^{-3}$ which enhances the impurity mobility, said impurity mobility compensating for temperature-caused variations in said lattice mobility so as to control over-all mobility to increase and then decrease, and resistivity to decrease and then increase over a temperature range of about 0–600° K.

10. A temperature compensated silicon semiconductor resistive member characterized by a doped silicon semiconductor body having a lattice mobility component of over-all mobility which decreases as a function of increasing temperature, having an impurity mobility component of over-all mobility which increases as a function of increasing temperature, and wherein the over-all mobility decreases with increasing temperature over a range of about 0–600° K., comprising, both shallow-level acceptor and shallow-level donor dopants only interspersed in said body, said donors having an atom concentration exceeding the atom concentration of said acceptors and providing a concentration of free carriers of a range about $1.2\times10^{19}$ electrons-cm.$^{-3}$, said acceptor atoms being present in a concentration exceeding $10^{18}$ atoms-cm.$^{-3}$, said acceptor atoms being present in a concentration exceeding $10^{18}$ atoms-cm.$^{-3}$, said body containing a total impurity concentration within the range of about $5.4\times10^{19}$ atoms-cm.$^{-3}$ which enhances the impurity mobility, said impurity mobility compensating for temperature-caused variations in said lattice mobility so as to allow over-all mobility to decrease and resistivity to increase with increasing temperature in a temperature range of about 0–600° K.

11. A temperature compensated silicon semiconductor resistive member characterized by a doped silicon semiconductor body having a lattice mobility component of over-all mobility which decreases as a function of increasing temperature, having an impurity mobility component of over-all mobility which increases as a function of increasing temperature, and wherein the over-all mobility and resistivity is substantially constant over a temperature range of about 0–600° K., comprising, both shallow-level acceptor and shallow-level donor dopants only interspersed in said body, said donors having an atom concentration exceeding the atom concentration of said acceptors and providing a concentration of free carriers in a range of about $8.6\times10^{18}$ electrons-cm.$^{-3}$, said acceptor atoms being present in a concentration exceeding $10^{18}$ atoms-cm.$^{-3}$, said body containing a total impurity concentration in the range of about $2.6\times10^{19}$ atoms-cm.$^{-3}$ to about $3.7\times10^{19}$ atoms-cm.$^{-3}$ which enhances the impurity mobility, said impurity mobility compensating for temperature-caused variations in said lattice mobility so as to control over-all mobility and resistivity to be substantially constant over the temperature range of about 0–600° K.

12. A temperature compensated silicon semiconductor resistive member characterized by a phosphorus doped silicon semiconductor body, having a lattice mobility component of over-all mobility which decreases as a function of increasing temperature, having an impurity mobility component of over-all mobility which increases as a function of increasing temperature, and exhibiting a resistivity wherein the improvement comprises, both boron shallow-level acceptor and arsenic shallow-level donor dopants only interspersed in said body, said donors having an atom concentration exceeding the atom concentration of said acceptors and providing a concentration of free carriers in a range from about $1.7\times10^{18}$ to $1.3\times10^{19}$ electrons-cm.$^{-3}$, said body containing a total impurity concentration wherein the sum of the shallow-level phosphorus, boron, and arsenic concentrations produces a total impurity concentration exceeding $8\times10^{18}$ atoms-cm.$^{-3}$ which enhances the impurity mobility, said impurity mobility compensating for temperature-caused variations in said lattice mobility so as to control, in a predetermined manner over a predetermined temperature range, variations in over-all mobility and resistivity caused by variations in temperature.

13. The semiconductor resistive member of claim 12 wherein separated ohmic contacts are attached to said diffused region.

References Cited

UNITED STATES PATENTS

| | | | |
|---|---|---|---|
| 2,860,218 | 11/1958 | Dunlap. | |
| 2,860,219 | 11/1958 | Taft et al. | |
| 3,181,097 | 4/1965 | Lehovec. | |
| 3,248,677 | 4/1966 | Hunter et al. | 338—7 |
| 3,310,502 | 3/1967 | Komatsubara et al. | 338—22 |

REUBEN EPSTEIN, Primary Examiner

U.S. Cl. X.R.

252—62.3; 317—240

PO-1050
(5/69)

UNITED STATES PATENT OFFICE

CERTIFICATE OF CORRECTION

Patent No. 3,491,325 Dated March 31, 1970

Inventor(s) Shih-Ming Hu

It is certified that error appears in the above-identified patent and that said Letters Patent are hereby corrected as shown below:

Column 5, lines 27-29, the denominator of the right hand side of the equation should appear as follows:

$$e^2h^2N_I$$

Column 7, lines 43-52, for curve 1, the number in the right hand column of the chart should be 3.2; for curve 2, the number in the right hand column should be 5.6; for curve 3, the number in the right hand column should be 4.8; for curve 4, the number in the right hand column should be 7.4; for curve 5, the number in the right hand column should be 5.4; for curve 7, the number in the right hand column should be 3.56; for curve 8, the number in the right hand column should be 0.80; for curve 10, the number in the right hand column should be 1.54. Column 9, line 44, "$1.3 \times 10^{18}$" should read --$1.3 \times 10^{19}$--. Column 10, line 17, after "inter-dispersion of" insert --both--; line 66, "exceding" should read --exceeding--. Column 11, line 16-17, delete "said acceptor atoms being present in a concentration exceeding $10^{18}$ atoms-cm.$^{-3}$,".

SIGNED AND SEALED

AUG 25 1970

(SEAL)

Attest:

Edward M. Fletcher, Jr.
Attesting Officer

WILLIAM E. SCHUYLER, JR.
Commissioner of Patents